United States Patent [19]
Tortoso

[11] 3,766,783
[45] Oct. 23, 1973

[54] GAS BULB FOR A GAS-FILLED DIAL THERMOMETER

[76] Inventor: John Tortoso, 405 Beach 9th St., Far Rockaway, N.Y. 11691

[22] Filed: Apr. 21, 1971

[21] Appl. No.: 135,959

[52] U.S. Cl. ............................. 73/368.2, 73/368.6
[51] Int. Cl. ............................................ G01k 5/36
[58] Field of Search ................... 73/368.2, 368.6; 53/22

[56] References Cited
UNITED STATES PATENTS

| | | |
|---|---|---|
| 2,426,663 | 9/1947 | Bevins .............................. 73/368.2 |
| 3,410,141 | 11/1968 | Zurstadt ............................ 73/368.2 |
| 2,475,317 | 7/1949 | Gess .............................. 73/368.6 X |

Primary Examiner—Richard C. Queisser
Assistant Examiner—Daniel M. Yasich
Attorney—Sughrue, Rothwell, Mion, Zinn & Macpeak

[57] ABSTRACT

A gas bulb for a gas-filled thermometer, the bulb containing activated coconut charcoal, and having dimensions such that the internal volume is about 0.15 cubic inches, operating on the principal of adsorption and emission of an agent of the activated coconut charcoal, thus indicating an appropriate change in temperature depending upon the amount of agent emitted or absorbed by the activated coconut charcoal.

13 Claims, 2 Drawing Figures

INVENTOR
JOHN TORTOSO
BY Sughrue, Rothwell, Mion, Zinn & MacPeak
ATTORNEYS

GAS BULB FOR A GAS-FILLED DIAL THERMOMETER

BACKGROUND OF THE INVENTION

1. Field of the Invention

The present invention relates to a novel gas bulb to be used in gas-filled thermometers.

2. Description of the Prior Art

There are two basic systems in standard gas bulb thermometer operation. One uses gas only and the other uses gas and gas-adsorbing material in the gas chamber (i.e., in the gas bulb).

The one which uses gas only depends on pressure generated by volumetric change, which in turn is caused by temperature excursions inposed on the gas. It can be shown from physical laws then, that the size of the gas bulb used must vary inversely with the temperature range.

The one that uses an adsorbent material in the gas chamber depends on pressure generated by volumetric change due to temperature excursions imposed on the gas, plus pressure caused by the adsorption/emission of the gas in the adsorbent material. Prior-art thermometers of this type, however, have made no apparent attempt to control the ratio of pressure due to thermal expansion versus pressure due to adsorption/emission from the adsorbent material. As a consequence, bulb size must vary inversely with the temperature range with this type also.

Ordinarily, prior art thermometers of the gas-only type are suitable for temperature ranges of from $-40°$ to $800°F$. The variety with adsorbent material in the gas bulb are suitable for temperature ranges of from well below $-40°$ to about $550°F$.

The gas bulb size of the gas-only variety typically varies from 0.5 to 1 inch in diameter and from 3.5 to 14.75 inches in length; while that of the type employing adsorbent material generally varies upward from 0.33 inch in length and 3 inches in diameter.

For example, the Taylor Instrument Co. manufactures a gas-only type (Catalogue No. 21P401) with a gas bulb having a volume of about 52cc and dimensions of 0.5 inch in diameter and a length of 14.75 inches.

Typically, the standard gas bulb is connected to a Bourdon gauge which registers a change in temperature by the amount of expansion or contraction of the Bourdon element depending upon the change of volume of the material in the gas bulb. The conventional gas bulb of the gas only variety might typically contain carbon dioxide, nitrogen, argon or any other similar gas. The pressure changes which operate the Bourdon gauge are those which may be read from the pressure/temperature curve of the gas being used, the Bourdon gauge reacting linearly with pressure change.

For example, U.S. Pat. No. 3,410,141 to Zurstadt discloses a gas charged remote thermometer having a thermal bulb charged with an expansible gas and a gas-adsorbent material (e.g., charcoal) which adsorbs gas molecules onto its surface at low temperatures and releases the molecules at higher temperatures. As a result, the increased pressure in the system results in an unwinding movement of the Bourdon tube gauge with a consequent movement of the indicator on the gauge, thereby registering the change in temperature. The movement of the indicator on the Bourdon gauge is proportional to the temperature change in the indicating gas bulb. The gas bulb is connected to the Bourdon gauge through a capillary tube, enabling the increase in pressure in the gas bulb to be transmitted to the Bourdon gauge. Zurstadt discloses that the volume of the gas bulb is substantially greater than the total volume of the capillary tube and the Bourdon tube, and as an example, discloses a bulb having a volume of about 0.27 cubic inch (i.e., a diameter of about 0.33 inch and a length of about three inches).

U.S. Pat. No. 2,426,663 to Bevins discloses a temperature responsive system comprising a compensating Bourdon tube connected with a gas adsorption medium having adsorbing and diffusing qualities responsive to temperature changes, the gas adsorption medium being a material such as activated coconut charcoal granules. The gas bulb is completely filled with the activated coconut charcoal and then evacuated at a temperature of about 150°C. and then charged with a suitable dry gas such as carbon dioxide. The bulb is then sealed and connected to the Bourdon tube for operation.

Some of the prior art devices require different size gas bulbs and capillary tubes for sensitivity to certain temperature ranges. For example, the following table shows the relationships that exist for prior art devices between gas bulb size, length of connecting capillary tube and temperature sensitivity:

| Bulb Size (length x diameter) (inches) | Maximum Length of Capillary (feet) | Temperature Sensitivity (°F) |
|---|---|---|
| 5 × ⅜ | 25 | −40 to 180 |
| 10 × ⅜ | 75 | −40 to 180 |
| 5.5 × ½ | 50 | 20 to 240 |
| 15 × ¾ | 150 | 50 to 500 |

Accordingly, with present techniques, it is sometimes necessary to change bulb size to extend the temperature sensitive range of the thermometer; in view of the limited range of temperature for a given gas bulb size.

The basic reason for a change in gas bulb size to accomodate temperature range changes is because prior art thermometers are primarily gas-expansion dependent. It can be seen from the volume/temperature/pressure relationships of any common gas that it is impractical to construct a system with useable operating pressures at the high end of the temperature range and sufficient pressure to operate the same system at the low end of the temperature range. The alternative, therefore, is to adapt the gas volume (bulb size) to ranges which encompass practical pressure excursions.

Accordingly, it would be desirable to provide a gas-filled thermometer utilizing a gas bulb of one size which would be applicable to a wide range of temperature and also which would be accurate over the entire applicable temperature range.

It is a primary object of the present invention to provide a gas bulb for a gas-filled thermometer which remedies the disadvantages of the prior art gas bulbs.

It is another object of the present invention to provide a gas bulb for a gas-filled thermometer which utilizes one size gas bulb for a very wide temperature range.

It is yet another object of the present invention to provide a gas bulb for a gas-filled thermometer wherein the one size gas bulb is extremely accurate over a very wide temperature range.

It is still another object of the present invention to provide a gas bulb for a gas-filled thermometer wherein the bulb is very small in size and yet sufficient to provide very accurate readings over a wide temperature range.

Other objects and advantages of the present invention will become apparent from the ensuing description.

SUMMARY OF THE INVENTION

The present invention provides a cylindrical gas bulb for a gas-filled thermometer having a volume of about 0.15 cubic inch, and containing therein a small amount of activated coconut charcoal as the adsorbent material. Preferably, the coconut charcoal has a size of from 6 to 15 mesh, the amount of coconut charcoal contained within the gas bulb being from about 0.6 to about 0.8 gram. The gas bulb of the present invention is extremely accurate over a temperature range of from −40° to 500°F.

DESCRIPTION OF THE PREFERRED EMBODIMENTS

Figure 1:
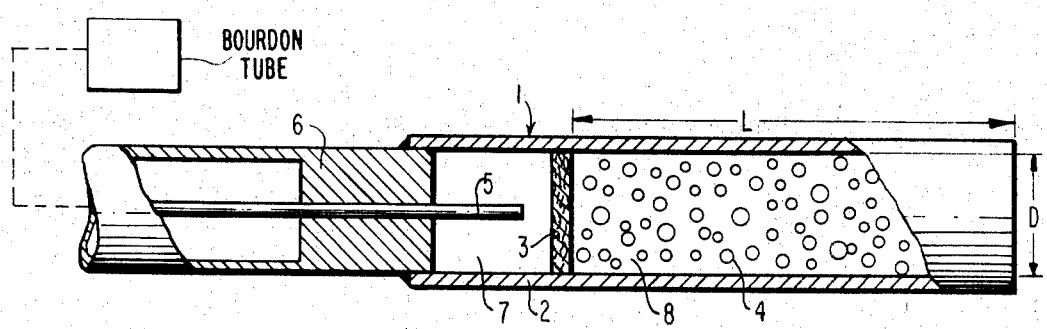
FIG. 1 is a cross-sectional view of the gas bulb of the present invention.

Referring now to the drawings, the gas bulb of the present invention is shown in cross-section in FIG. 1. The gas bulb is generally designated 1 in FIG. 1 and comprises a cylindrical casing 2 defining a chamber therein, portion 8 of the chamber being separated from portion 7 of the chamber by means of a filter 3. Disposed within portion 8 of the chamber are a plurality of activated coconut charcoal particles 4 and extending into chamber portion 7 is a capillary tube 5, supported by means of member 6. Capillary tube 5 is connected at the other end (not shown) to the temperature gauge in the indicator portion of the thermometer.

As shown in FIG. 1, portion 8 of the chamber has a certain length L and a certain diameter D. For the purposes of the present invention, the preferred length of chamber portion 8 is about 1,375 inches while the preferred diameter of chamber portion 8 is about 0.250 inch. Actually, these dimensions may be varied as desired so long as the internal volume of the gas bulb is about 0.15 cubic inch. Thus, the diameter may vary from 0.250 to 0.375 inch and the length from 1.350 to 1.5 inch.

As described above, the gas and adsorbent material type thermometer relies on the pressure generated by the expanding gas plus the increase in pressure due to the gas emitted from the adsorbent material. However, prior art thermometers of this type exhibit a very strong dependency on the gas volume in the gas bulb, whereas the gas bulb of the present invention reduces and substantially eliminates this dependency.

Figure 2:
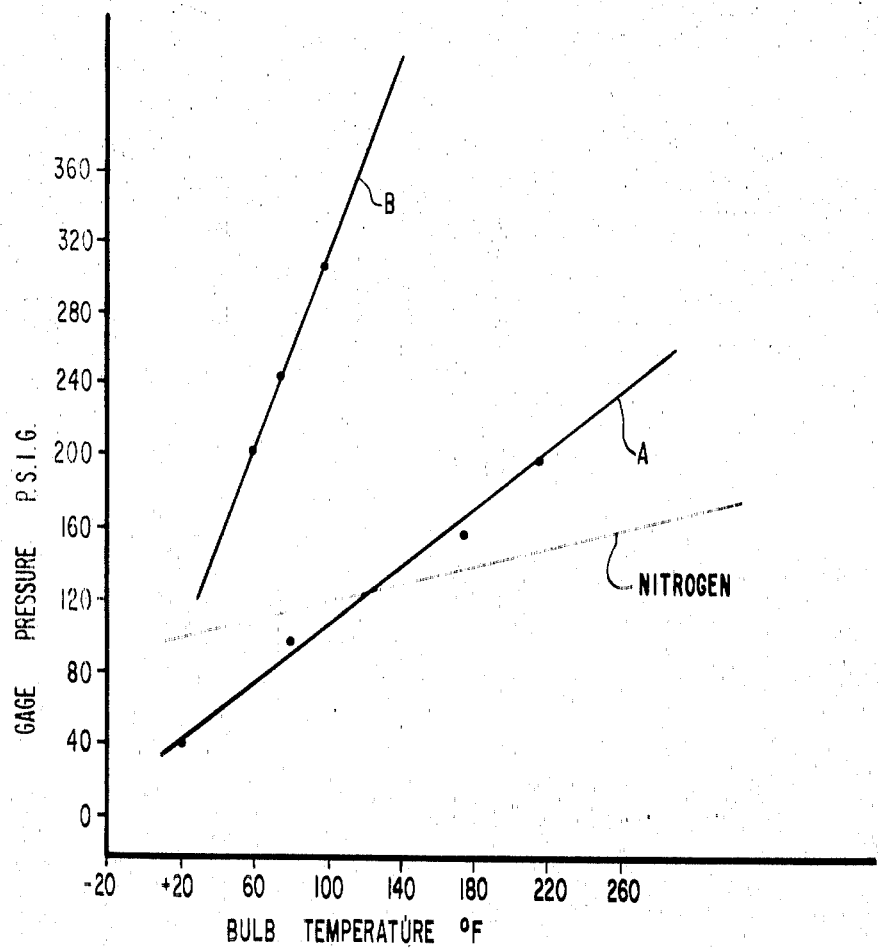
FIG. 2 represents the pressure - temperature relationships that exist in a prior art thermometer and in the device of the present invention.

Further, the ratio of the dependency of pressure due to expansion of gas versus emitted gas in prior art thermometers is unpredictable, as can be seen by referring to FIG. 2.

Curve A is a curve showing prior-art temperature versus pressure. The Zurstadt patent describes an eight to 10 times increase in the slope of the curve when compared to a standard gas filled bulb. Curve B demonstrates a truly adsorption-emission system with an increase over the slope of the standard gas bulb equal to or better than the prior art. The significant difference is in the pressure increase, with a decrease in bulb size, linearly over a normal range.

Prior-art adsorbent-emission thermometers are sensitive to the volume of the capillary leading to the indicator, showing a dependency on the gas in the sensing bulb. By comparison, the gas bulb of the present invention is not sensitive to the length and size of the capillary, up to about 100 feet. This indicates a relative lack of dependency on the gas volume in the sensing bulb, and thus a primary dependency on the adsorption/emission of the gas.

This feature enables the gas bulb of the present invention to provide extremely accurate and easily reproducible temperature measurement due to the lack of dependency on the gas volume in the gas bulb.

The use of the gas bulb of the present invention having the dimension above described provides for an extremely accurate temperature measurement over a wide range of temperature, i.e., from about −40° to 500°F. The accuracy of the gas-filled thermometer using the gas bulb of the present invention is such that the error factor is less than 2 percent over the entire range of temperature given above.

Ordinarily, tha material which is contained within chamber portion 8, constitiuing the adsorbing and gas-releasing material, is coconut charcoal which has been activated by certain procedures; since activated coconut charcoal is very advantageous from the viewpoint of reliability and repeatability.

For the best results, it is preferred to incorporate into chamber portion 8 from 0.6 to 0.8 gram of the activated coconut charcoal. Preferably, about 0.6 gram of the activated coconut charcoal is contained within chamber portion 8 of the gas bulb of the present invention.

In order to achieve the best results, the procedure which is followed for activating the coconut charcoal in the gas bulb is very important. In other words, if the proper procedure is followed, an excellent accuracy over the temperature-sensitive range is assured and the operation of temperature sensing is extremely predictable and repeatable.

The preferred procedure for adding and activating the coconut charcoal to the gas bulb of the present invention will be described hereinbelow. Firstly, about 0.6 gram of coconut charcoal having a size of about 6 to about 15 mesh is placed into the gas bulb of the present invention and a screen filter 3 is placed over the end of chamber portion 8 of the gas bulb. A capillary tube is then inserted into chamber portion 7. The bore of the capillary is preferably about 0.007 inch, but a capillary having a bore of from 0.007 to 0.010 inch may be employed.

The gas bulb is then attached to a suitable indicating means (e.g., a C-shaped Bourdon tube), and the resulting system is then evacuated (20–30 inches of mercury) for a period of time of from 4 to 6 hours in order to remove any foreign gas from the closed system. While under the vacuum conditions, the gas bulb is heated several times in order to degas the charcoal. During this heating, the temperature should be approximately 900°F., although a temperature ranging from 800° to 900°F. is satisfactory.

After the last time the gas bulb is heated to the aforedescribed temperature, it is placed in a bath at a temperature approximately 10°F above the bottom of the range which the thermometer is designed to read, and the system is then pressurized to a pressure of from 100 to 180 psi if a C-shaped Bourdon is used, or to about 360 psi with a spiral-shaped Bourdon, with a gas such as nitrogen, or any other conventional inert gas used in prior art thermometers of this type.

The system is then sealed off and the thermometer is now ready to function. However, one further modification of the speed control is necessary because coconut charcoal does not emit a gas linearly. A special lug is used to compensate for the inaccuracy that occurs during filling of the gas bulb.

In addition to the particular dimensions of the gas bulb of the present invention, the mesh of the activated coconut charcoal is an important factor in obtaining accurate temperature readings. A very large or very small mesh is undesirable because the surface area of the charcoal would be reduced, thus reducing the ratio of gas adsorbent and emitted, which would not provide a sufficiently large force to drive the indicating means. The most preferred size for the activated coconut charcoal for the purposes of the present invention is from 6 to 15 mesh.

Any arrangement of a pressure-sensitive temperature indicator and the gas bulb described above which will result in an indication of the proper temperature according to the pressure changes in the gas bulb is satisfactory for purposes of the present invention. It is to be understood that the particular indicator device employed in conjunction with the gas bulb is not critical to the present invention, but rather, it is the gas bulb per se and the method of charging the same which constitutes the most important aspects of the present invention; that is, with respect to the gas bulb per se, the most important feature is the size thereof in relation to the designated temperature sensitive range. In other words, any conventional means may be employed which is sensitive to the pressure change in the gas bulb and which will accurately convert such pressure change to a temperature change.

Although the length of the capillary tube from the gas bulb to the indicator device is not critical, it is generally preferred that the length of the capillary be from 10 feet to 100 feet.

What is claimed is:

1. A gas bulb for a gas-filled remote thermometer consisting essentially of a cylindrical inert gas-containing housing having an internal volume of no greater than 0.15 cubic inch, said housing also containing a gas-adsorbing material degassed of substantially all foreign gases and which adsorbs and emits said inert gas with a proportional change in temperature, said gas-adsorbing material consisting essentially only of activated coconut charcoal having a size of from about 6 to 15 mesh and being present in an amount of from 0.6 to 0.8 gram, said gas bulb providing accurate and measurable changes of pressure within said housing due to the adsorption and emission of said gas by said gas-adsorption material over the entire temperature range of from −40° to 500°F.

2. The gas bulb of claim 1 wherein said housing has a diameter of from about 0.250 to about 0.375 inch and a length of from about 1.350 to about 1.5 inch.

3. The gas bulb of claim 2 wherein about 0.6 gram of said activated coconut charcoal is present in said housing.

4. A remote thermometer system effective over a temperature range of from −40° to 500°F. comprising the gas bulb of claim 1, a pressure-sensitive temperature indicator and a capillary tube connecting said glass bulb and said indicator, whereby said indicator registers the temperature which said gas bulb is subjected to by means of the pressure change in said gas bulb communicated to said indicator through said capillary tube, said gas bulb having been pressurized with said inert gas at a temperature of about −30°F.

5. The remote thermometer system of claim 4 wherein said gas bulb is pressurized to a pressure of from 100 to 360 psi.

6. The thermometer system of claim 4 wherein said indicator is a Bourdon tube temperature gauge.

7. The thermometer system of claim 6 wherein the length of said capillary tube varies from 10 to 100 feet and wherein the bore of said capillary tube varies from 0.007 to 0.010 inch.

8. The thermometer system of claim 7 wherein the bore of said capillary tube is about 0.007 inch.

9. The gas bulb of claim 1 wherein said housing contains said inert gas in an amount sufficient to provide a pressure of from 100 to 360 psi, said gas bulb having been pressurized at a temperature of about 10°F higher than the lower temperature of the range of temperature said gas bulb is adapted to measure.

10. A method of charging a gas-filled remote thermometer designed to operate accurately over a given temperature range with a gas-adsorbing material comprising;

1. providing a gas bulb having an internal volume of no greater than 0.15 cubic inch;
2. charging said gas bulb with from 0.6 to 0.8 gram of a gas-adsorbing material consisting essentially only of activated coconut charcoal having a size of from 6 to 15 mesh;
3. providing a pressure-sensitive temperature indicating device and connecting said device to said gas bulb by means of a capillary to form a remote thermometer system;
4. simultaneously evacuating said thermometer system and heating said system to substantially completely degas said gas-adsorbing material;
5. heating said system to a temperature of about 10°F. above the lower temperature of said given range; and
6. pressurizing said system with an inert gas.

11. The method of claim 10 wherein said system is evacuated to a pressure of from about 20 to about 30 inches of mercury and simultaneously heated several times to a temperature of from 800° to 900°F over a period of from 4 to 6 hours.

12. The method of claim 11 wherein said system is pressurized to a pressure of from 100 to 360 psi with nitrogen, carbon dioxide or argon.

13. The method of claim 12 wherein said given temperature range is from −40° to 500°F.

* * * * *